United States Patent [19]

Wachi et al.

[11] Patent Number: 5,079,757
[45] Date of Patent: Jan. 7, 1992

[54] SERVO CIRCUIT FOR AN OPTICAL DISK INFORMATION RECORDING AND REPRODUCING APPARATUS WITH IMPROVED STABILITY FOR TRACKING AND FOCUSING CONTROL

[75] Inventors: Shigeaki Wachi; Shinichiro Kuwabara, both of Tokyo, Japan

[73] Assignee: Sony Corporation, Tokyo, Japan

[21] Appl. No.: 128,934

[22] Filed: Dec. 4, 1987

[30] Foreign Application Priority Data

Dec. 5, 1986 [JP] Japan ................ 61-288708

[51] Int. Cl.$^5$ ............................. G11B 7/095
[52] U.S. Cl. .................... 369/44.26; 369/44.35; 369/58
[58] Field of Search .................. 369/44–46, 369/53–54, 58, 100, 106, 109, 111, 124, 44.26, 44.27, 44.29, 44.32, 44.34, 44.35; 358/342; 250/201, 204, 201.1, 201.5

[56] References Cited

U.S. PATENT DOCUMENTS

| | | | |
|---|---|---|---|
| 4,023,033 | 5/1977 | Bricot et al. | 250/204 X |
| 4,512,002 | 4/1985 | Kosaka et al. | 369/124 X |
| 4,616,354 | 10/1986 | Yoshida | 369/44 |
| 4,651,314 | 3/1987 | Yoshikawa et al. | 369/54 X |
| 4,661,942 | 4/1987 | Yoshimoto et al. | 369/44 |
| 4,674,076 | 6/1987 | Hsieh et al. | 369/44 X |
| 4,707,816 | 11/1987 | Yonezawa et al. | 358/342 X |

FOREIGN PATENT DOCUMENTS 0201603 11/1986 European Pat. Off. .
0225258 6/1987 European Pat. Off. .
0227445 7/1987 European Pat. Off. .
60-85444 5/1985 Japan .

OTHER PUBLICATIONS

Patent Abstracts of Japan, vol. 9, No. 227, (P-388)[1950], 9/13/85, JP-60-85444.

Primary Examiner—Roy N. Envall, Jr.
Assistant Examiner—W. R. Young
Attorney, Agent, or Firm—Hill, Van Santen, Steadman & Simpson

[57] ABSTRACT

In an optical disk information recording and reproducing apparatus for writing and reading information to and from the optical disk using the optical disk as a record medium on which pre-grooves are formed and address signals are prerecorded on land sections among these pre-grooves presenting physical changes in the form, a servo circuit therein for executing tracking and/or focusing control is disclosed. In the servo circuit, by providing a switch for opening and closing control loops for said tracking and focusing control and by controlling said switch to open during reproduction of the address signals recorded on the address area of the optical disk, servo signals including noise due to pits presenting physical changes in the form on the address area are eliminated so as to establish tracking and/or focusing control. This serves to enable information writing and reading to and from the record area of the optical disk with high reliability and stability.

4 Claims, 7 Drawing Sheets

SERVO CIRCUIT FOR AN OPTICAL DISK INFORMATION RECORDING AND REPRODUCING APPARATUS WITH IMPROVED STABILITY FOR TRACKING AND FOCUSING CONTROL

BACKGROUND OF THE INVENTION

1. Field of the Invention

This invention relates to a servo circuit of an optical disk information recording and reproducing apparatus that executes tracking control and/or focusing control for writing and/or reading information to or from the optical disk used as a record medium. More particularly, the invention is applied to an optical disk information recording and reproducing apparatus that writes and/or reads information to or from the optical disk wherein pre-grooves are provided and address signals are prerecorded on the respective land sections among these pre-grooves presenting physical changes in the form.

2. Description of the Prior Art

In a conventional optical disk information recording and reproducing apparatus, as shown in FIGS. 1 and 2, an optical disk 1 in which a record surface 2 is formed with a vertical magnetizing membrance having the opto-magnetic effect or Kerr effect for example is used as a record medium. In the optical disk 1, there are provided plural land sections each of which are formed between concentric pre-grooves G at equal intervals to serve as record tracks TR. One track is for example divided into 36 of 0 to 35 sectors, and each sector is further divided into a record area WA for writing information thereon and an address area AA for writing address signals thereon to designate the record area WA.

To the record area WA, a laser beam 10a which is modulated by recorded information is irradiated. Together with it, by imparting a magnetic field using a subsidiary magnetic field generating means such as a magnet so as to reverse the direction of magnetization of the recording surface 2 formed with the vertical magnetizing membrance having the opto-magnetic effect, signals are recorded to the record area WA. Also, in the address area AA, a pit row with the pits P in the form of projections and recesses designating the track address of the corresponding record area WA is previously provided presenting physical changes in the form. These pits P have the depth d of about $\lambda/8$ to $\lambda/4$ corresponding to the wavelength of the laser beam $\lambda$ used for writing and reading information.

Further, to a leading part of the address area AA, an address mark AM consisting of a pit pattern in the form of projections and recesses with the predetermined length is formed so as to indicate that this area is the address area.

In order to execute writing and reading information to the record area WA reliably, in the optical disk information recording and reproducing apparatus using the aforementioned optical disk 1 as a record medium, a servo circuit 30 is provided as shown in FIG. 3. For example in the servo circuit 30, focusing control or tracking control of the laser beam is executed in such a manner that a laser beam 10a radiated from a laser diode 10 irradiates the record surface 2 of the optical disk 1 through an optical head 20, and its reflected light 10b is detected therefrom.

The servo circuit 30 comprises a photodetector 31 with plural light receiving elements, a matrix circuit 32, a servo signal processing circuit 33 and a driving circuit 34. There are also provided a servo loop 37A for focusing control and a servo loop 37B for tracking control. In the respective servo loops 37A, 37B, focusing drive signals FD and tracking drive signals TD that are controlled based on the detection signals $S_1, S_2 \ldots Sn$ by said photodetector 31 such that focusing errors and tracking errors of the optical system 10 become zero are supplied to a focusing coil 21A and a tracking coil 21B, respectively.

The photo detector 31 consists of for example plural detecting elements $D_1, D_2 \ldots Dn$, with RF signals and various servo signals being detected from the detection signals $S_1, S_2 \ldots Sn$ detected from said elements.

The matrix circuit 3 performs the predetermined arithmetic operating and processing on the detection signals $S_1, S_2 \ldots Sn$ by the photo detector 31 to output focusing error signals FE and tracking error signals TE.

The configuration for obtaining the focusing error signals FE is for example disclosed in the U.S. Pat. No. 4,023,033, and the one for obtaining the tracking error signals TE in the European Patent No. 0,201,603 although the detailed explanations of them are abridged since they differ from the essential part of the present invention.

The servo signal processing circuit 33 is formed by a focusing processing circuit 33A and a tracking processing circuit 33B. The focusing processing circuit 33A executes phase compensation on the focusing error signals FE so as to stabilize the operation of the servo loop 37A for focusing control. Similarly, the tracking processing circuit 33B executes phase compensation on the tracking error signals TE so as to stabilize the operation of the servo loop 37B for tracking control.

Further, the driving circuit 34 is formed by a focusing drive amplifier 34A and a tracking drive amplifier 34B. By amplifing the focusing error signals FE supplied from the focusing processing circuit 33A with phase compensation already been executed with an optimum loop gain, said focusing drive amplifier 34A forms the focusing drive signals FD which make focusing errors of the optical system zero and supplies them to the focusing coil 21A. Also, by amplifying the tracking error signals TE supplied from the tracking processing circuit 33B with phase compensation already been executed with an optimum loop gain, said tracking drive amplifier 34B forms the tracking drive signals TD which make tracking errors of the optical system 20 zero and supplies them to the tracking coil 21B.

In the servo circuit 30 with the above-mentioned configuration, the focusing error signals FE or tracking error signals TE are obtained by detecting the changes in the spot of the laser beam 10b reflected on the record surface 2 of the optical disk 1 by the photodetector 31. And by supplying the focusing drive signals FD and tracking drive signals TD that are formed based on the focusing error signals FE and tracking error signals TE respectively to the focusing coil 21A and the tracking coil 21B through the servo loops 37A, 37B, the light spots of the laser beam 10a radiated on the optical disk 1 are focused on the record surface 2. Together with it, focusing control and tracking control are performed such that the light spots of the laser beam trace the center of the tracks TR of the optical disk 1 that is rotating at a constant velocity.

In case the focusing control by the servo loop 37A or the tracking control by the servo loop 37B is performed with such conventional servo circuit 30, when the light spots of the laser beam tracking the record tracks TR formed on the record surface 2 of the optical disk 1 pass the address area AA having rows of the pits P in the form of projections and recesses presenting the physical changes in the form, there is caused an irregular light diffraction to the return laser beam 10b reflected by the record surface 2 due to these pits P of the address area AA. This results in an abrupt fluctuation of the outputs of the photodetector 31 (about 20dB).

Because of this, when the light spots of the laser beam stay in the address area AA, noise signals in the form of bursts are caused. At indicated in FIG. 4, this large impact noise is superimposed on the focusing drive signals FD or the tracking drive signals TD supplied to the focusing coil 21A and the tracking coil 21B, respectively.

In accordance with it, the focusing coil 21A and the tracking coil 21B are affected by such impact noise n to cause irregular and sudden fluctuations of the optical elements such as an object lens 20A operated at the focusing coil 21A or a galvanomirror 20B operated at the tracking coil 21B, both of which being components of the optical system 20, momentarily, to render the positional control of the optical system 20 temporarily difficult.

In order to eliminate the effect by the impact noise it may be contemplated to add a low-pass filter or use a secondary interpolating system for elimination or compensation thereof, respectively. However, the impact noise n extends over a wide range so that the servo circuit may be undesirably complicated or enlarged in size.

OBJECTS AND SUMMARY OF THE INVENTION

It an object of the present invention to provide a servo circuit of an optical disk information recording and reproducing apparatus with an optical disk used as a record medium having an address area on which address signals designating a record area are prerecorded presenting physical changes in the form, whereby information can be written or reproduced to and from the record area thereof with improved accuracy and stability by eliminating effects by the impact noise that are caused when the light spots of a laser beam irradiated the optical disk are staying in the address area.

It is another object of the present invention to provide a servo circuit of an optical disk information recording and reproducing apparatus whereby irradiating time of a laser beam on an address area of the optical disk is detected on the basis of the detected signals of a return light of the laser beam irradiated thereon so as to terminate supplying the driving coil of the optical system irradiating the laser beam with at least either ones of focusing error signals or tracking error signals using a switch means.

It is a still another object of the present invention to provide a servo circuit of an optical disk information recording and reproducing apparatus whereby address marks recorded in a leading part of an address area of the optical disk are detected to form timing signals for opening a switch means so as to terminate supplying a driving coil of the optical system with focusing error signals and/or tracking error signals.

Other object and advantage of the invention will be apparent in the following description, the appending claims and the accompanying drawings.

DESCRIPTION OF THE PREFERRED EMBODIMENT

Figure 5:
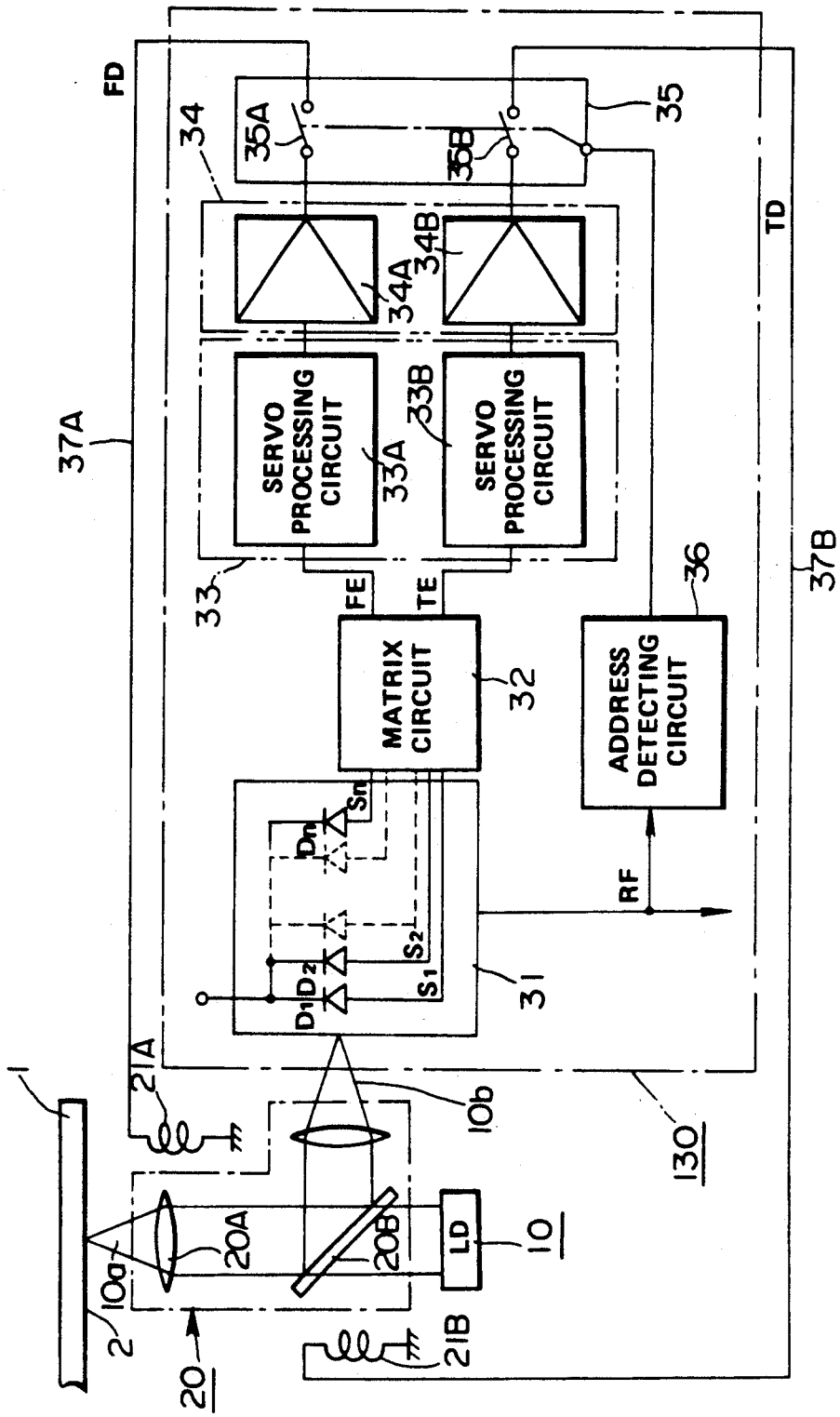
FIG. 5 is a block diagram showing an embodiment of a servo circuit for the optical disk information recording and reproducing apparatus according to the present invention.

FIG. 5 illustrates a configuration of a servo circuit for an optical disk information recording and reproducing apparatus of the present invention.

Figure 1:
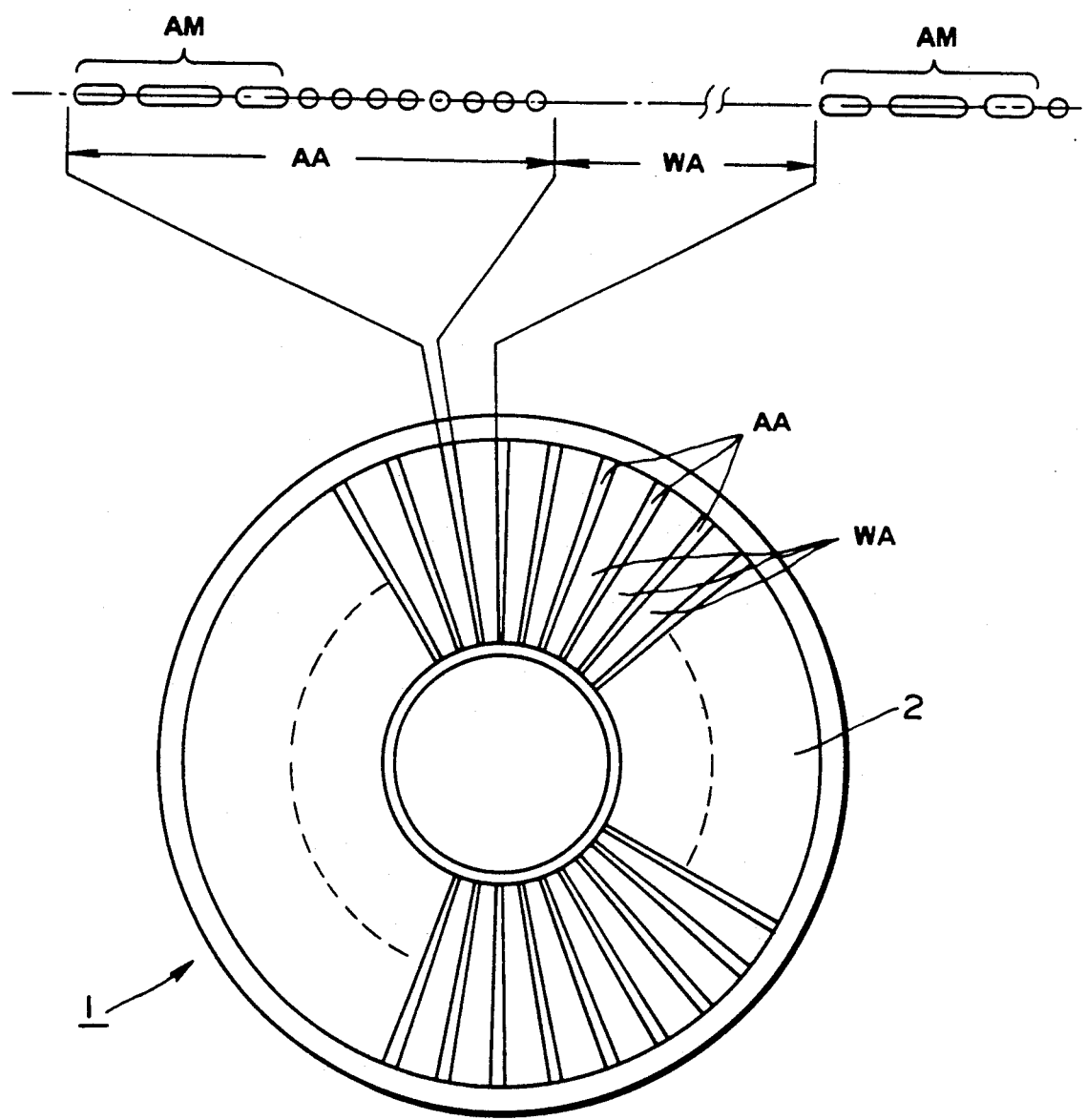
FIG. 1 is a diagrammatic view showing a structure of an optical disk having a record area and an address area.
Figure 2:
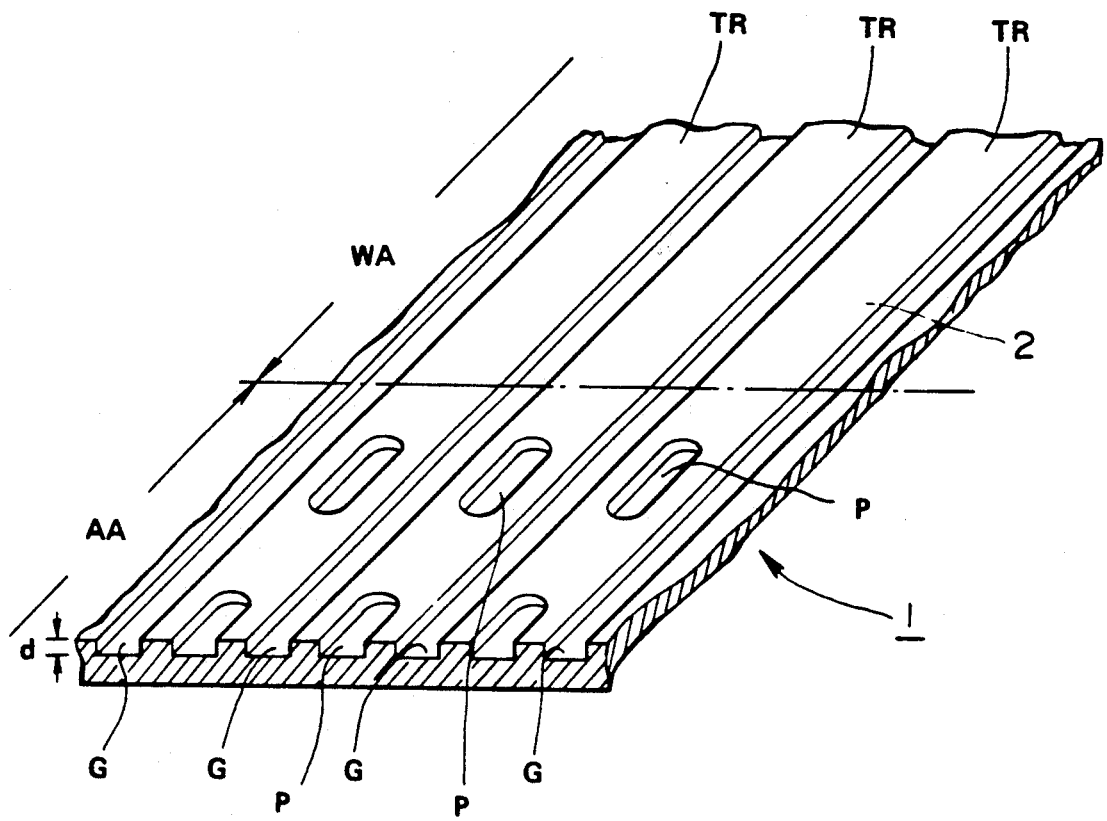
FIG. 2 is a view in perspective of the optical disk of FIG. 1, with a boundary part of the record area and the address area enlarged for clarity.
Figure 3:
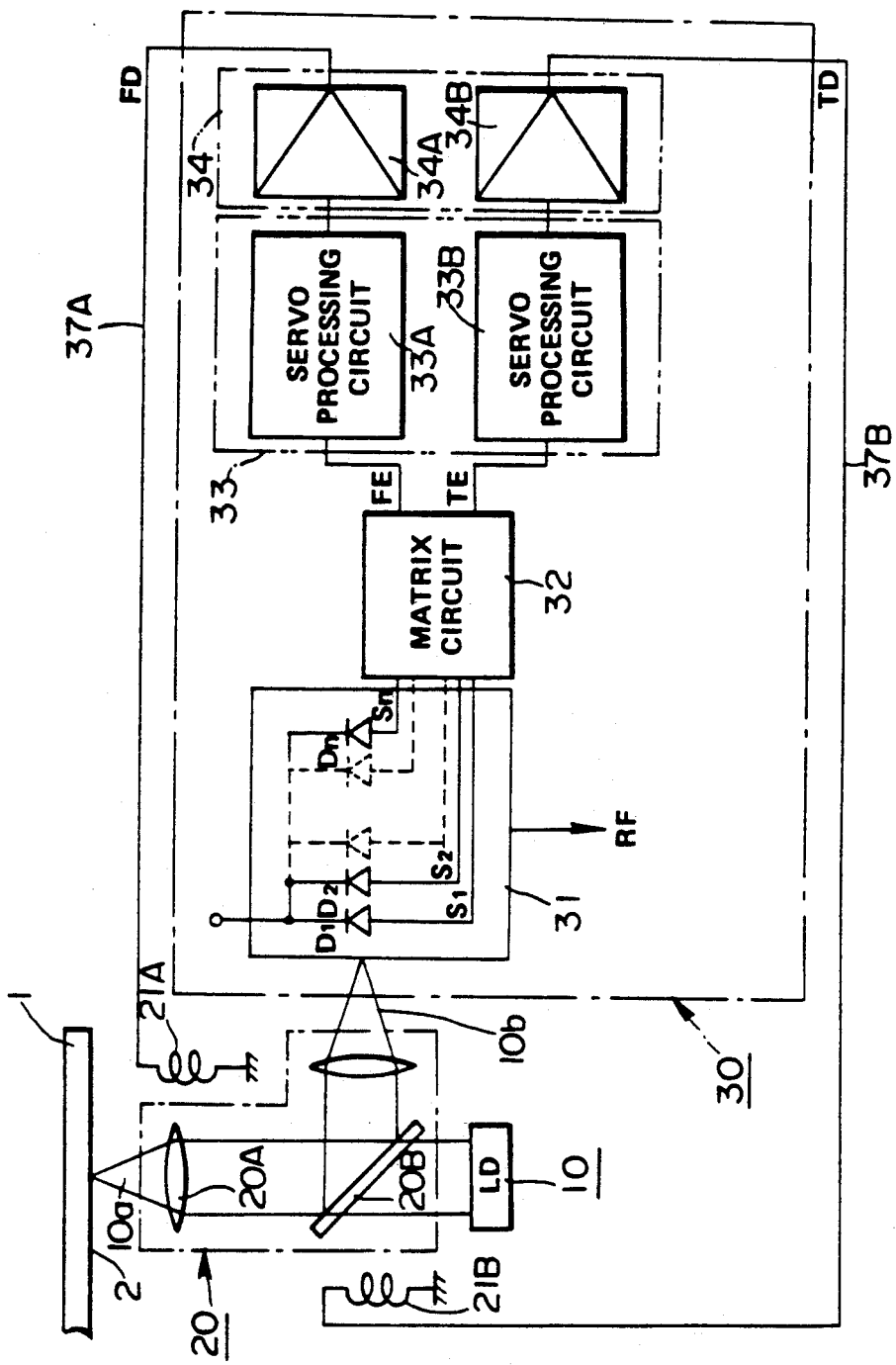
FIG. 3 is a block diagram showing a conventional embodiment of a servo circuit for the optical disk information recording and reproducing apparatus with the optical disk used as a record medium.
Figure 4:
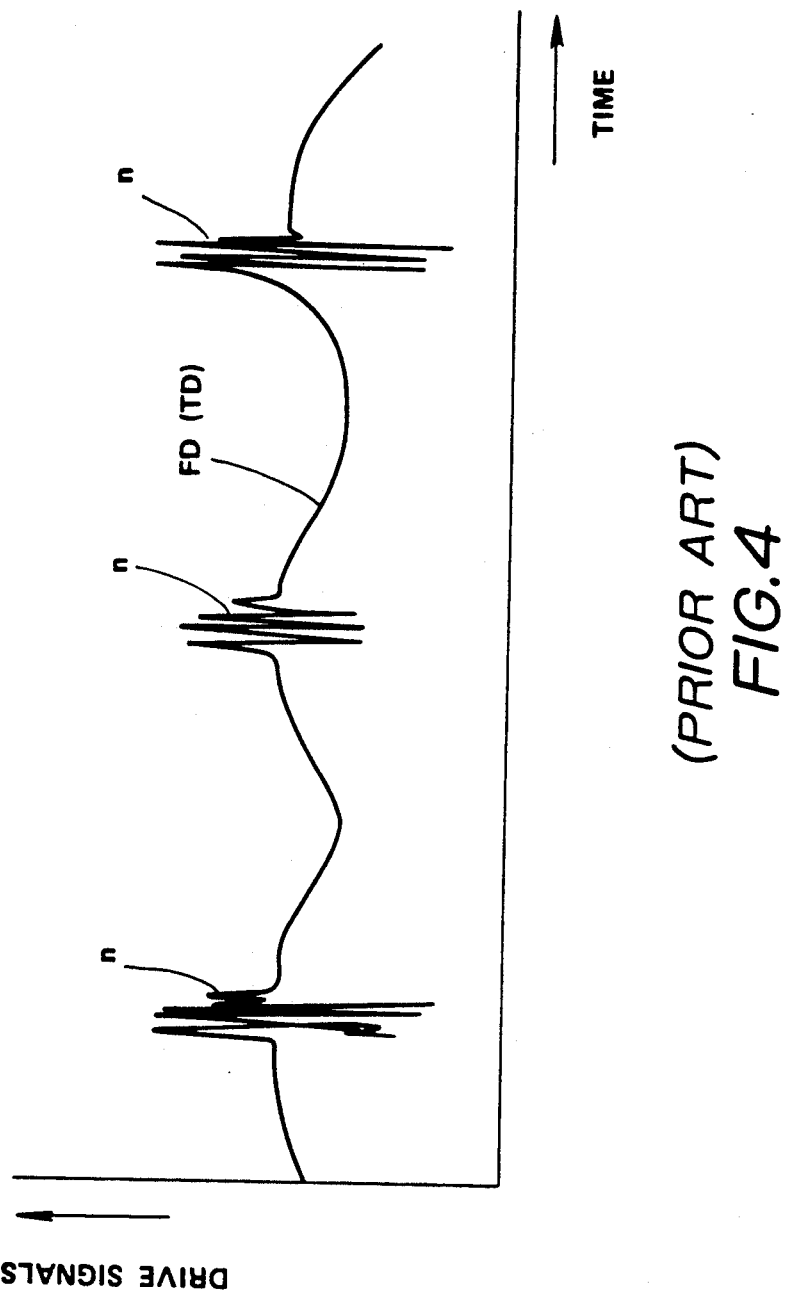
FIG. 4 shows a waveform of the driving signals supplied to a driving coil of the optical system in the embodiment of FIG. 3.

In this figure, the present invention is applied to the servo circuit 30 for the optical information recording and reproducing apparatus of FIG. 3 using the optical disk 1 of FIGS. 1 and 2 as a record medium. It is to be noted that the same parts as those of the conventional optical disk information recording and reproducing apparatus are indicated by the same reference numerals and that the detailed description thereof is omitted for simplicity.

The servo circuit 130 of the embodiment is comprised of a switch circuit 35 for opening and closing the respective servo loops 37A, 37B that supply driving signals FD, TD to a focusing coil 21A and a tracking coil 21B driving the optical elements such as an object lens 20A and a galvanomirror 20B forming an optical head 20, and an address detecting circuit 36 discriminating a record area WA and an address area AA of the optical disk 1 from the RF signals supplied from a photodetector 31 detecting a reflected light 10b by a record surface 2 of the optical disk 1 on which a laser beam 10a is irradiated through said optical system 20 from a laser diode 10 and supplying switch opening and closure control signals SS to said switch circuit 35.

The switch circuit 35 is provided on the output side of a drive circuit 34 to which focusing error signals FE and tracking error signals TE obtained by the prescribed arithmetic operating and processing on the detection signals $S_1, S_2 \ldots S_n$ from the photodetector 31 at a matrix circuit 32 are supplied through a servo signal processing circuit 33. The switch circuit 35 consists of a twin switch 36A, 36B controlled by the opening and closure control signals SS supplied from the address detecting circuit 36, and is connected in series between the respective output terminals of a focusing drive amplifier 34A and a tracking drive amplifier 34B forming the drive circuit 34 and the focusing coil 21A and the tracking coil 21B.

The address detecting circuit 36 forms clock signals and sector address signals from the data of the address area AA of the optical disk 1 based on the RF signals. Together with it, the address detecting circuit 36 forms signals indicating the interval $T_{AA}$ during which the laser beam 10a generated by the laser diode 10 traces the address area AA based on the detecting timing $t_0$ of address mark signals AM by detecting the address mark signals AM recorded to the leading part of the address area AA from the RF signals, and supplies thus formed signals to a control input terminal of the switch circuit 35 as the opening and closure control signals SS. The address detecting circuit 36 performs control operation of the switch circuit 35 by closing the respective switches 35A, 35B during the period $T_{WA}$ when the laser beam 10a is tracing the record area WA of the optical disk 1, and opening them during the period $T_{AA}$ when the address area AA is being traced thereby.

Figure 6:
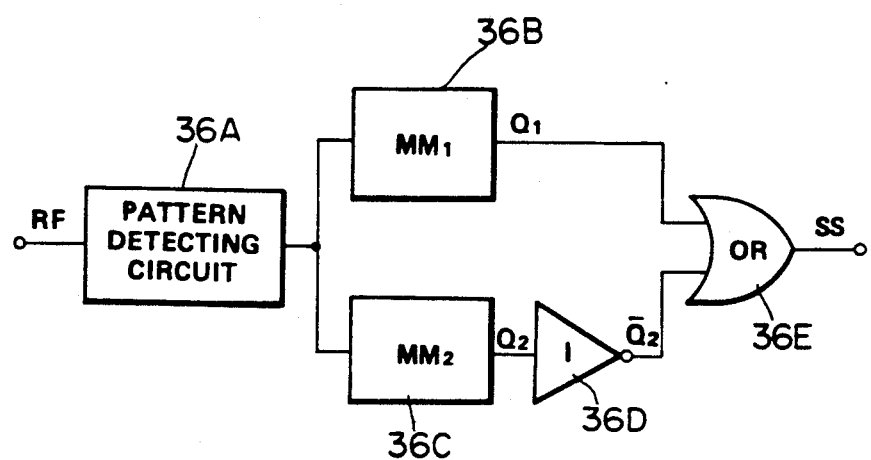
FIG. 6 is a block diagram showing the practical configuration of an address detecting circuit that forms the embodiment of FIG. 5.

With reference to FIG. 6, the thus operating address detecting circuit consists of for example a pattern detecting circuit 36A for detecting said address mark signals AM indicated by a pit pattern of projections and recesses of the predetermined length, two monostable multivibrators 36B, 36C being triggered by the detected output of the pattern detecting circuit 36A, an inverter 36D for reversing polarity of the outputs $Q_2$ of the monostable multivibrator 36C, and an OR gate circuit 36E to which outputs $Q_1$ of the monostable multivibrator 36B and outputs $\overline{Q_2}$ of the inverter 36D are supplied.

Figure 7:
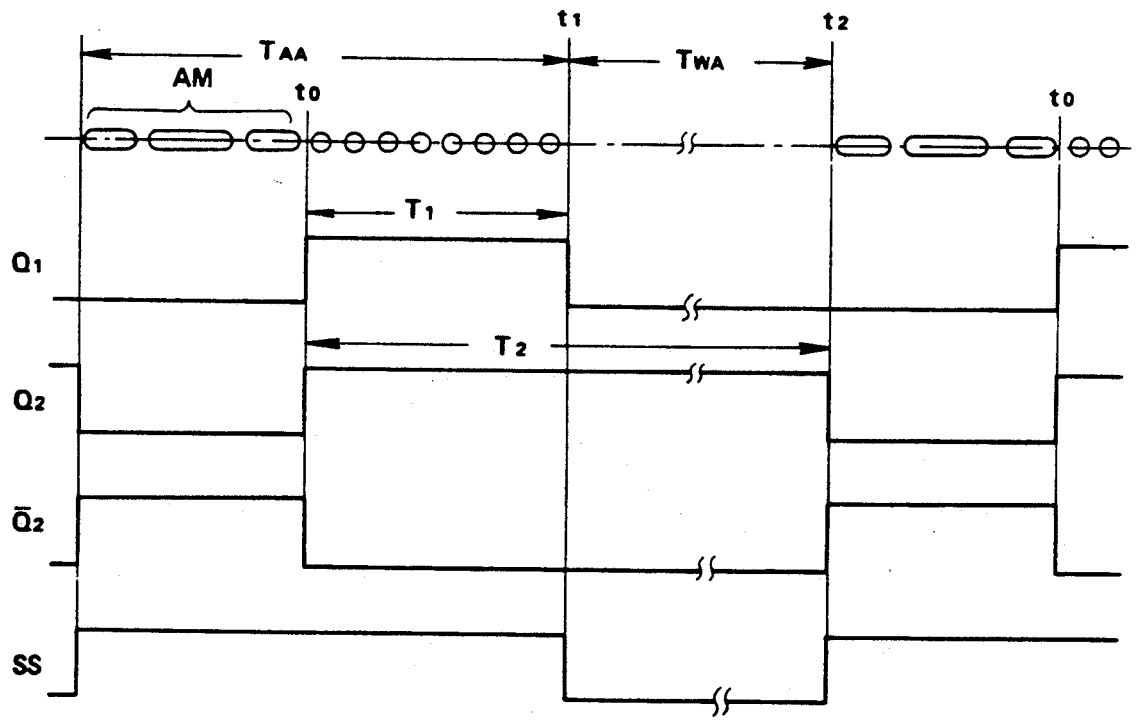
FIG. 7 is a timing chart showing the operation of the address detecting circuit of FIG. 6.

As shown in FIG. 7, the monostable multivibrator 36B is triggered at detection timing $t_0$ of the address mark signals AM due to the detected outputs of the pattern detection circuit 36A, and supplies the OR gate circuit 36E with the outputs $Q_1$ that becomes logic 'H' only for the interval when the address area AA is over, that is, the interval $T_1$ until the record area WA starts from timing $t_1$. Also, the monostable multivibrator 36C is triggered at detection timing $t_0$ of the address mark signals AM due to the detected outputs of the pattern detection circuit 36A, and supplies the OR gate circuit 36E through the inverter 36D with the output $Q_2$ that becomes logic 'H' only for the interval when the record area WA is over, that is, the period $T_2$ the address area AA starts from timing $t_2$. In connection with this, the OR gate circuit 36E output opening and closure control signals SS for opening the switch circuit 35 becoming logic 'H' for the interval $T_{AA}$ corresponding to the address area AA of the optical disk 1 and for closing the switch circuit 35 becoming logic 'L' for the interval $T_{WA}$ corresponding to the record area WA.

Figure 8:
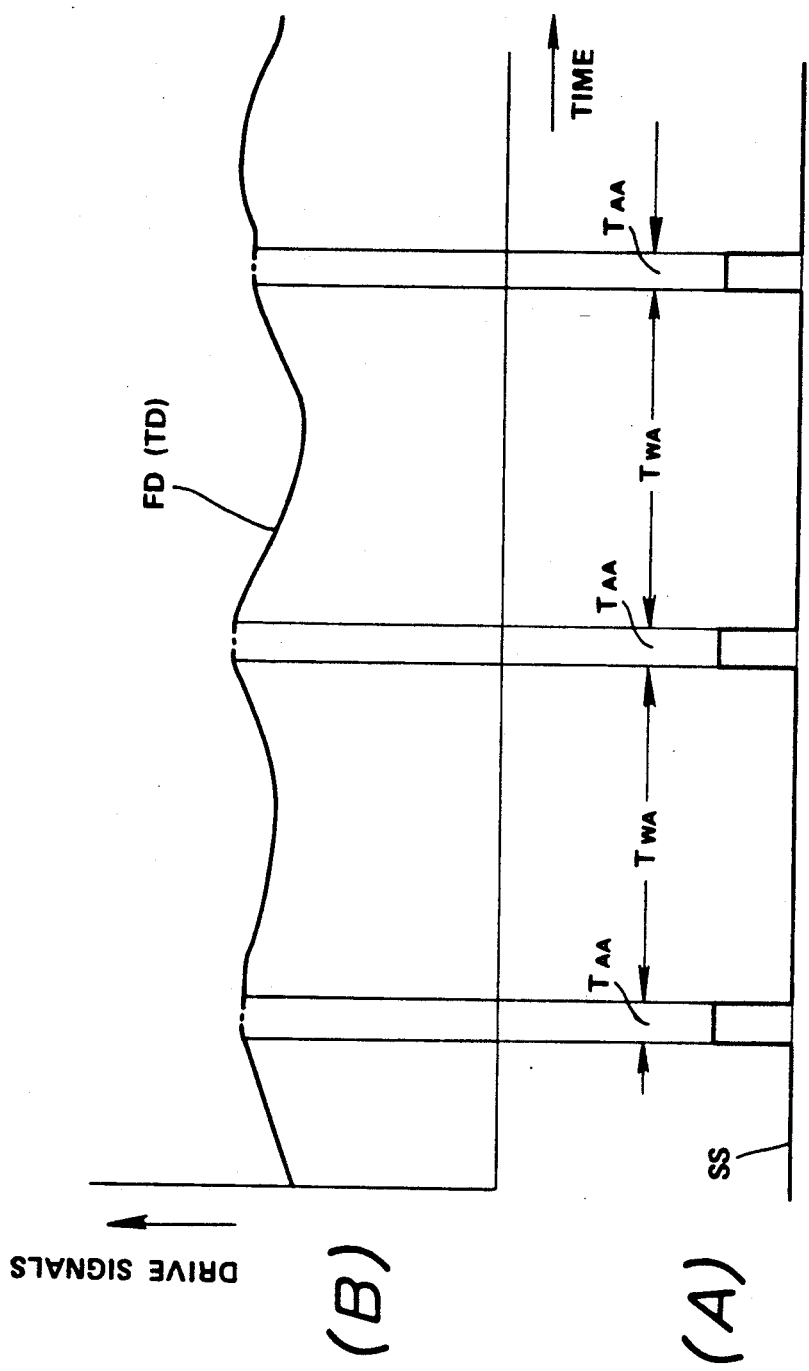
FIG. 8(A) and (B), shows a waveform of the detected signals of the address detecting circuit and the driving signals supplied to the driving coil of the optical system of the embodiment of FIG. 6.

In the servo circuit 130 of the present embodiment, the opening and closure control signals SS formed at the address detecting circuit 36 as shown in FIG. 8A controls the operation of the switch circuit 35 in such a manner that, as shown in FIG. 8B, the respective drive signals FD, TD formed at the drive circuit 33 are supplied to the focusing coil 22A and tracking coil 21B during the interval $T_{WA}$ when the record area WA of the optical disk 1 is being traced, and the supply of those drive signals FD, TD is cut-off during the interval $T_{AA}$ when the address area AA is being traced.

Stated differently, during the interval $T_{WA}$ when the laser beam 10a generated from the laser diode 10 is tracing the record area WA of the optical disk 1, the switch circuit 35 provided on the output side of the drive circuit 34 is closed by the opening and closure control signals SS from the address detection circuit 36. By this, the focusing drive signals FD and tracking drive signals TD formed at the focusing drive amplifier 34A and tracking drive amplifier 34B constituting the drive circuit 34 are supplied to the focusing coil 21A and tracking coil 21B so as to execute focusing control and tracking control of the laser beam 10a to the objected record tracking TR on the optical disk 1.

Also, during the interval $T_{AA}$ when the laser beam 10a is tracing the address area AA of the optical disk 1, since the switch circuit 35 is opened by the opening and closure control signals SS, the supply of the focusing drive signals FD and tracking drive signals TD containing noise elements generated in the reflected light 10b of the laser beam 10a irradiated the address area AA to the focusing coil 21A and tracking coil 21B is cut-off.

Since the supply of the focusing drive signals FD and tracking drive signals TD is cut-off during the interval $T_{WA}$ as indicated by a dotted line of FIG. 8B, focusing control and tracking control of the laser beam 10a are not performed. Yet, the interval $T_{AA}$ corresponding to the address area AA is approximately 80 $\mu S$, being extremely shorter than that of $T_{WA}$ corresponding to the record area WA of 720 $\mu S$. In this way, if focusing and tracking control is released for the very short interval $T_{AA}$ of 80 $\mu S$, the respective optical elements of the optical system 20 driven by the focusing coil 21A and tracking coil 21B perform an inertial movement by the inertial force due to the mass proper to themselves, so that the optimum focusing and tracking states are maintained without being affected by noises.

In the present embodiment, the switch circuit 35 may be provided between any components that form the servo loops 37A, 37B for supplying the focusing coil 21A and tracking coil 21B with the respective drive signals FD, TD, for example between the servo signal processing circuit 33 and the drive circuit 34.

Also in the present embodiment, the focusing servo loop 37A and the tracking servo loop 37B are opened or closed simultaneously. As an alternative, control may be so made as to open or close either one of these servo loops 37A, 37B.

Although the present invention has been shown and described with respect to preferred embodiments, various changes and modifications which are obvious to a person skilled in the art to which the invention pertains are deemed to lie within the spirit and scope of the invention.

What is claimed is:

1. A servo circuit of an optical disk information recording and reproducing apparatus comprising photodetecting means receiving a return light of a laser beam irradiated on said optical disk having a writable record area and an address area on which address signals for designating the record area are prerecorded presenting physical changes in the form, an optical system for focusing and tracking said laser beam under control of drive coil means, matrix circuit means for performing arithmetic operations on and processing of detected signals from the photodetecting means and outputting focusing error signals and tracking error signals therefrom, signal processing circuit means for phase compensating said focusing error signals and tracking error signals, and drive circuit means for amplifying output signals of said signal processing circuit means to an optimum level and for supplying said signals as drive signals for focusing and tracking to said drive coil means of the optical system, characterized in that the servo circuit further comprises:

switch means for opening and closing the supply lines of said focusing error signals and tracking error signals supplied to said drive coil means, and address detecting circuit means for detecting an interval when the laser beam irradiates the address area of said optical disk on the basis of the detected signals by said photodetecting means, wherein said switch means disconnects said focusing error signals and tracking error signals from said drive coil means during the detected interval when the laser beam is irradiating the address area of the optical disk so that no error signal is applied to said drive coil means during said interval, said optical system being controlled by inertia through coasting during the interval when said laser beam is irradiating said address area.

2. A servo circuit of an optical disk information recording and reproducing apparatus according to claim 1 wherein said switch means is provided on the output side of said drive circuit means.

3. A servo circuit of an optical disk information recording and reproducing apparatus according to claim 1 wherein said address detecting circuit means detects address marks recorded in a leading part of said address area.

4. A servo circuit of an optical disk information recording and reproducing apparatus according to claim 3 wherein said address detecting circuit means comprises first and second timing means and outputs timing signals for opening said switch means on the basis of the signals corresponding to a first prescribed time interval established by said first timing means and a second prescribed time interval established by said second timing means, and means for initiating operation of said first and second timing means in response to address marks recorded on the address area.

* * * * *